(12) United States Patent
Perkins

(10) Patent No.: US 9,027,748 B1
(45) Date of Patent: May 12, 2015

(54) LIQUID FILLING KIT

(76) Inventor: William Perkins, St. Paul, MN (US)

( * ) Notice: Subject to any disclaimer, the term of this patent is extended or adjusted under 35 U.S.C. 154(b) by 593 days.

(21) Appl. No.: 13/373,273

(22) Filed: Nov. 8, 2011

Related U.S. Application Data

(60) Provisional application No. 61/456,677, filed on Nov. 10, 2010.

(51) Int. Cl.
*B65D 85/78* (2006.01)
*A23G 9/00* (2006.01)

(52) U.S. Cl.
CPC .. *B65D 85/78* (2013.01); *A23G 9/00* (2013.01)

(58) Field of Classification Search
CPC ...... B65D 85/78; B42P 2201/00; A23G 9/00; A23G 9/04; A23G 9/12; A23G 9/485; A23G 9/221; A23G 9/283; A23G 3/26; A23G 9/28
USPC .......... 206/223, 546, 568, 577; 141/316, 390; 248/99
See application file for complete search history.

(56) References Cited

U.S. PATENT DOCUMENTS

| | | | | |
|---|---|---|---|---|
| 102,616 A * | 5/1870 | Sweigert | ......................... | 248/97 |
| 2,069,266 A * | 2/1937 | Nicodemus | .................. | 53/385.1 |
| 2,172,529 A * | 9/1939 | Barker et al. | .................. | 248/97 |
| 2,175,324 A * | 10/1939 | Stamp | ............................. | 249/92 |
| 2,591,261 A * | 4/1952 | Holahan | .......................... | 249/92 |
| 2,702,011 A * | 2/1955 | Larkin | ............................. | 249/92 |
| 3,001,381 A * | 9/1961 | Frei | .................................. | 249/71 |
| 4,139,029 A * | 2/1979 | Geraci | ............................. | 141/98 |
| D349,992 S * | 8/1994 | Brohan | ............................ | D34/5 |
| 5,960,983 A * | 10/1999 | Chan | ............................... | 220/666 |
| 6,116,549 A * | 9/2000 | Santa Cruz et al. | ............. | 248/97 |
| 6,209,346 B1 * | 4/2001 | Frosch | ........................... | 62/457.7 |
| 6,422,753 B1 * | 7/2002 | Thomas | ......................... | 383/209 |
| RE40,284 E * | 5/2008 | Thomas et al. | .................. | 53/412 |
| D678,927 S * | 3/2013 | Rhodes, Sr. | .................. | D15/199 |
| 2005/0040051 A1* | 2/2005 | Martin | .......................... | 206/215 |
| 2006/0108240 A1* | 5/2006 | MacKinnon | .................. | 206/223 |
| 2008/0110195 A1* | 5/2008 | Markum | ......................... | 62/344 |
| 2009/0068324 A1* | 3/2009 | Sandoval | ...................... | 426/134 |
| 2011/0182533 A1* | 7/2011 | Scott | ............................. | 383/119 |
| 2012/0001035 A1* | 1/2012 | Michel | ............................ | 248/97 |
| 2013/0004628 A1* | 1/2013 | Williams et al. | .............. | 426/134 |
| 2013/0011531 A1* | 1/2013 | Wolf | .............................. | 426/241 |

* cited by examiner

*Primary Examiner* — Anthony Stashick
*Assistant Examiner* — Ernesto Grano
(74) *Attorney, Agent, or Firm* — Eggink & Eggink; Anthony G. Eggink; Katrina M. Eggink

(57) ABSTRACT

A liquid filling kit having a container with a separable bottom and top member and containing the remaining cooperating elements of the filling kit. A plurality of elongated legs, a pouch holding rack and a filling member are provided to allow flexible pouches to be filled and sealed with premixed liquids for subsequent use. The bottom member may be adapted to receive the elongated legs to thereby elevate the pouch holding rack and the filling member so that the premixed liquids may be poured through the compartments of the filling member into the open pouches held by the holding rack therebelow. Subsequent use of the filling kit, the components may be disassembled for storage within the bottom and top members forming the container.

16 Claims, 6 Drawing Sheets

LIQUID FILLING KIT

This application claims the benefit of U.S. Provisional Application Ser. No. 61/456,677, filed Nov. 10, 2010.

BACKGROUND OF THE INVENTION

The present invention relates generally to a liquid filling kit and particularly to a filling kit which is easily assembled to fill sealable pouches with a liquid or liquid mixture for subsequent consumption or storage.

The popularity of freezies, popsicles and the like for children is known as is the use of premixed ingredients for making mixed drinks, such as margaritas and the like for adults. However, children and adults typically prefer specified flavors and/or mixtures of ingredients which are difficult to find, costly to purchase and difficult to package and store. There clearly is a need in the marketplace for an assembly which allows a user to produce a wide variety of premade liquid mixtures that may be frozen and subsequently used when desired.

The liquid filling kit or the Pinch Pops Kit of the present invention provides an easy to assemble and use filling kit that allows a user to fill premixed liquids into plastic pouches that may be sealed, frozen and subsequently used when desired.

SUMMARY OF THE INVENTION

A liquid filling kit comprising a generally rectangular container or box having mating bottom and top portions and which contains the cooperating functional elements for the assembly and use of the filling kit.

The filling kit container may house a plurality of elongated legs, a pouch holding rack, a filling top member, a plurality of pouches and a recipe book which allows a user to easily assemble and fill the pouches with a desired liquid for subsequent use.

The filling kit container may comprise a container top and a container bottom, the latter adapted to receive the elongated leg members and to hold the pouch holding rack and filling member in an elevated position so that pouches may be filled with a desired liquid mixture, for example. The pouches may then be removed, sealed, stored and subsequently used.

The filling kit container and its elements may be molded of a polymeric material or the like and which may be easily cleaned. The pouches used in connection with the filling kit may be flexible polymeric pouches which may also be washable and reused and which are formed to be used with the cooperating elements of the filling kit and which may utilize a sealable top, such as a Ziploc® closing structure or the like.

A benefit of the present invention is to provide a liquid filling kit which is economical, easily assembled and used and which allows a user to produce sealed pouches having predetermined liquid mixtures of specified volumes.

These and other benefits of this invention will become clear from the following description by reference to the drawings.

DESCRIPTION OF THE PREFERRED EMBODIMENTS

The present invention relates to a pouch filling kit for liquids comprising a container which is used to erect the filling assembly and to house the cooperating members of the filling assembly. The cooperating members include a pouch holding means, pouch filling means and means to elevate the pouch holding and filling means.

Figure 1:
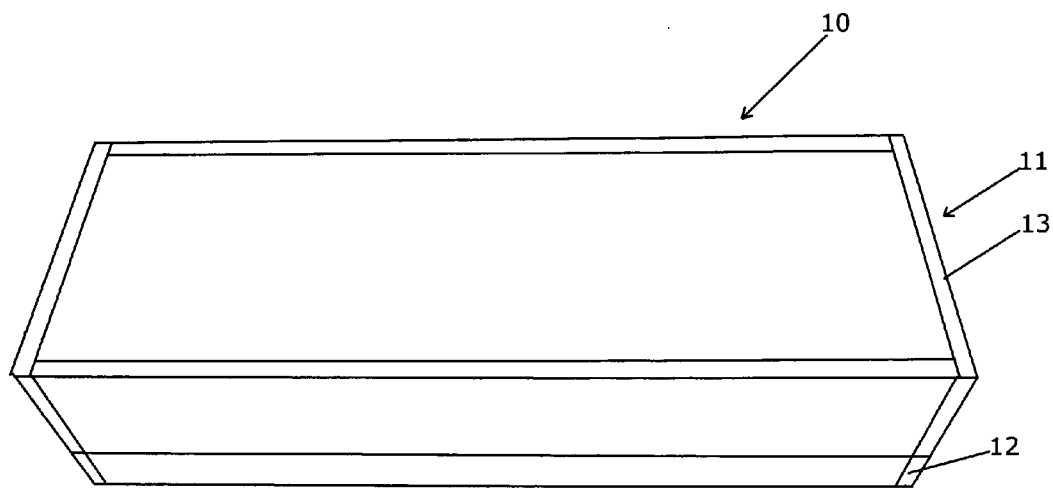
FIG. 1 is a perspective view showing the liquid filling kit of the present invention in a collapsed and storable state and within a rectangular container.
Figure 2:
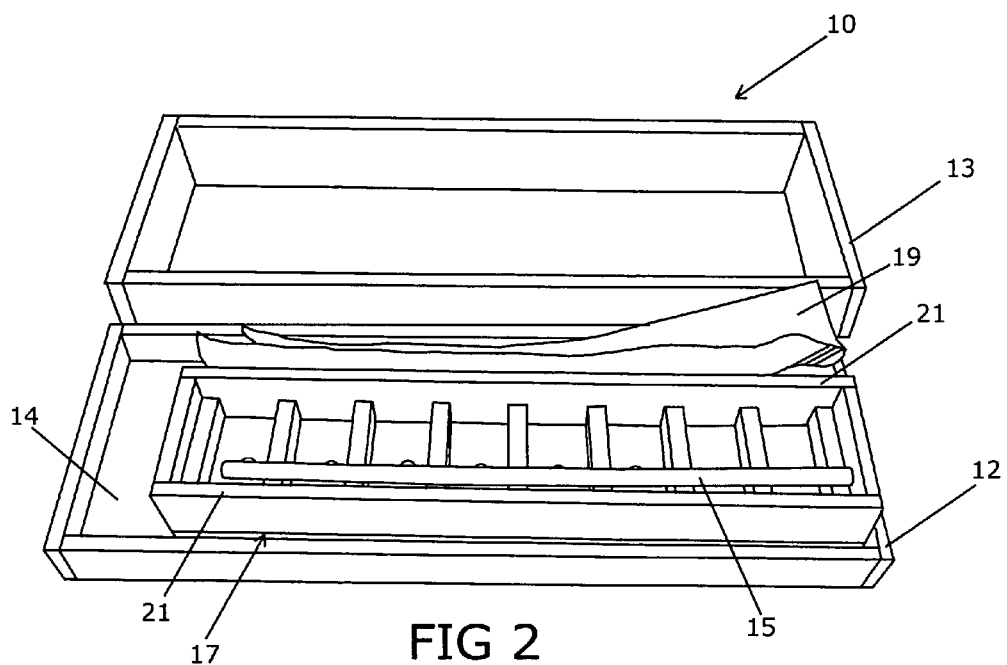
FIG. 2 is a perspective view showing the liquid filling kit of FIG. 1 having the top of the kit container removed to show the stored cooperating components.
Figure 3:
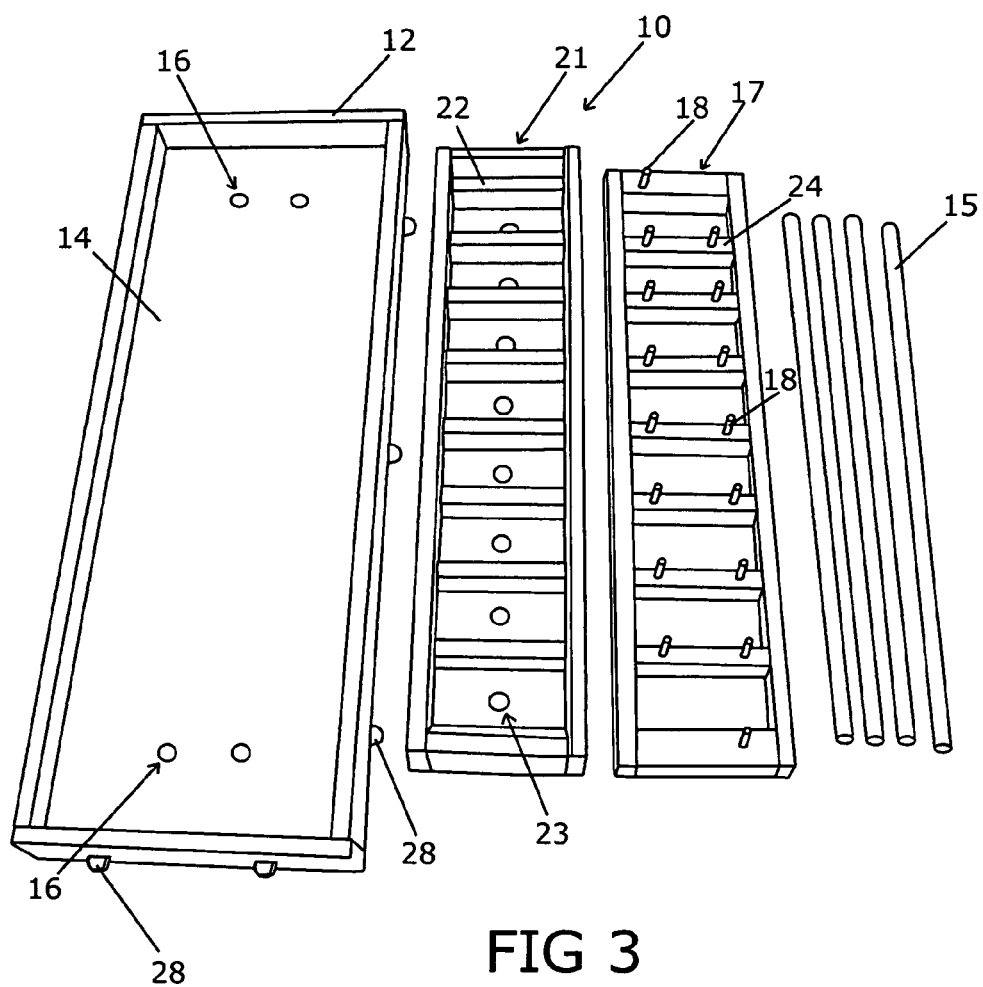
FIG. 3 is a perspective view showing the cooperating components of the liquid filling kit.

Referring to FIGS. 1-3, the liquid filling kit 10 is shown comprising a generally rectangular container or box 11 having a container bottom portion 12 and a container top portion 13. The filling kit 10 may be formed of a rigid material such as a polymeric or plastic molded structure. The filling kit 10 is shown in its closed or stored configuration in FIG. 1 and in its open position in FIG. 2, the latter showing the contained cooperating elements, namely, the bottom surface 14 of the container bottom 12, elongated leg member 15, a pouch holding rack 17, a filling member 21 as well as a sealable pouch 19.

Referring to FIG. 3, the cooperating elements of the liquid filing kit 10 are shown comprising the container bottom member 12 having a bottom surface 14 with apertures 16. The reference to top and bottom members is for convenience, since the bottom apertures for the leg members may be placed into the container top member, for example. Further shown are four elongated leg members 15, a pouch holding rack 17 with dividers 24 having spaced pegs 18 and a filling member 21 having a plurality of filling compartments defined by spaced dividers 22 and apertures or holes 23 in the bottom of each compartment of the filling member 21.

Figure 4:
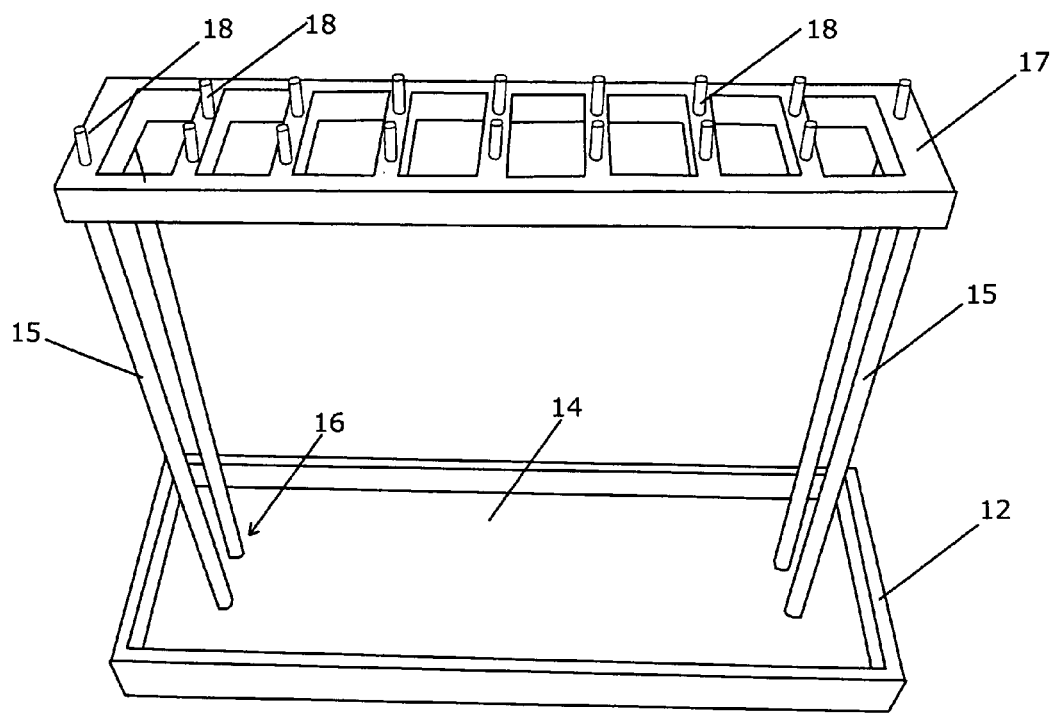
FIG. 4 is a perspective view showing the pouch holding rack positioned onto the top of the leg members.
Figure 5:
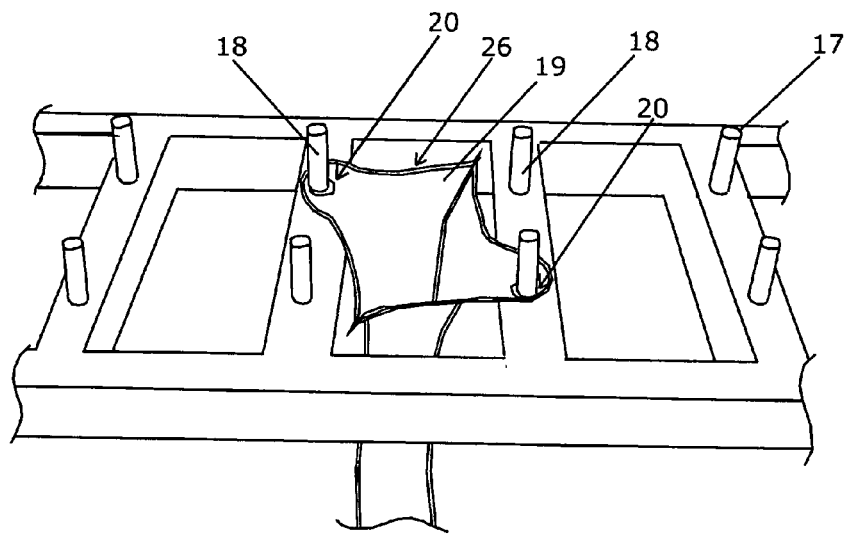
FIG. 5 is a perspective view showing the top of a pouch held by the pegs of the holding rack.
Figure 6:
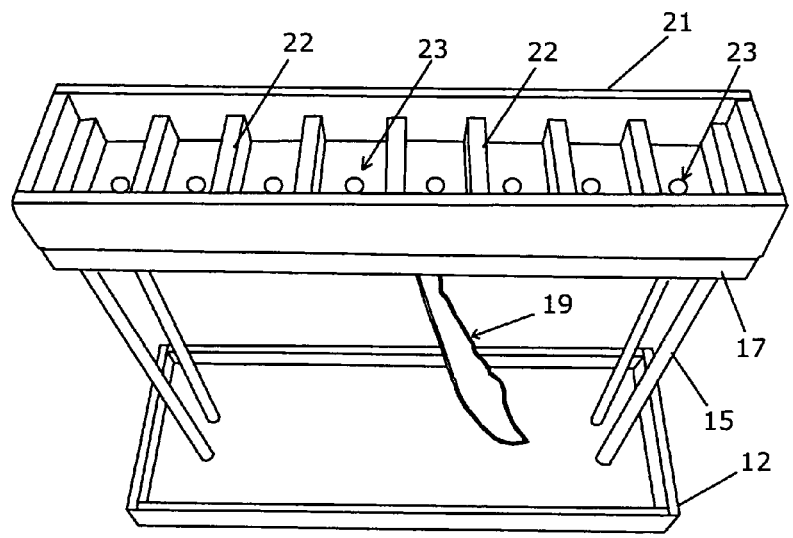
FIG. 6 is a perspective view showing the filling member positioned onto the top of the pouch holding rack.

Referring to FIGS. 4-6, an initial step sequence of assembling the liquid filling kit of the invention is shown. In FIG. 4, the elongated legs 15 are shown frictionally positioned into apertures 16 in the bottom 14 of the container bottom member 12 and the pouch holding rack 17 is shown mounted onto the top terminal ends of the leg members 15, the latter via frictional means into aligned apertures, for example. The holding rack 17 is shown having a plurality of spaced pegs 18 which are shown extending upwardly. The pegs 18 are shown positioned to permit the staggered holding of the pouch top portions 26 to provide a larger opening for the pouch tops during the filling process, as shown in FIG. 5.

Referring to FIG. 5, a pouch 19 is shown having a top portion having opposing apertures 20 which are positioned over opposing pegs 18 to thereby provide an opening into the top of the pouch 19. In FIG. 6, the filling member 21 is shown positioned on top of the pouch holding rack 17. The filling member 21 is a generally rectangular structure having a plurality of dividers 22 forming a plurality of cavities each having an aperture 23 which is aligned with the open top of pouch 19 held beneath the apertures 23. A bottle or similar container having a predetermined liquid source may be used for filling the cavities of the filling member 21 so that the liquid may drain through apertures 23 and into the aligned open tops of pouches 19 being held below by pegs 18 on dividers 24 of the pouch holding rack 17. The pouch 19 may be provided with a fill line for alerting the user when the desired liquid content has been reached.

Figure 7:
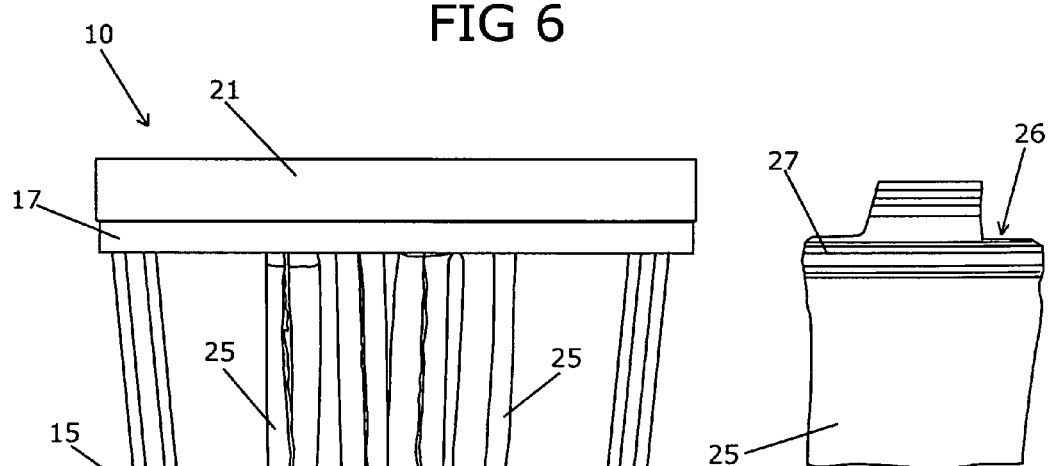
FIG. 7 is a perspective view showing a plurality of filled pouches held within the filling kit.
Figure 8:
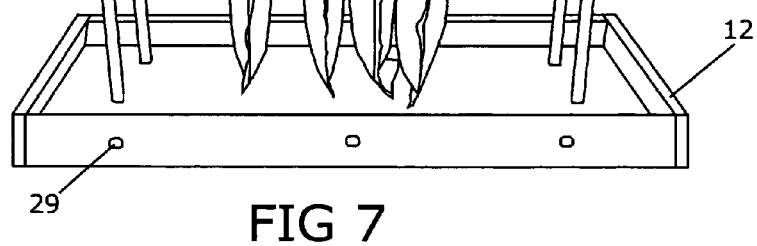
FIG. 8 is a perspective view showing the top of a filled pouch in a sealed condition.

In FIG. 7, the liquid filling kit 10 is shown to have a plurality of pouches 19 depending from the holding rack 17 so as to provide a plurality of filled pouches 25. In FIG. 8 the top portion 26 of the filled pouch 25 is shown in a sealed configuration which may, as shown, utilize a Ziploc® closing structure 27 or like closing structure.

Figure 9:
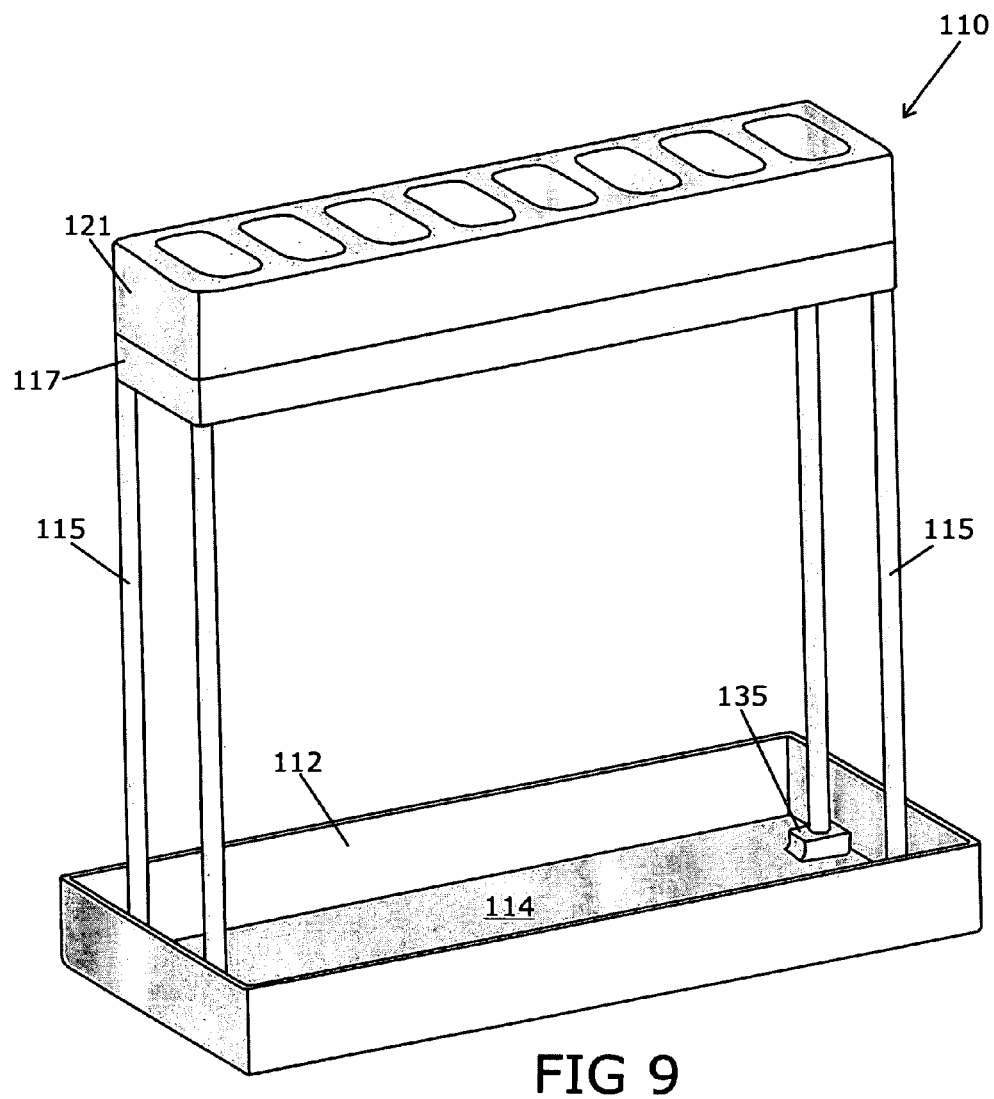
FIG. 9 is a perspective view of another embodiment of the filling kit of the present invention.

Referring to FIG. 9, another embodiment of the filling kit of the invention is shown. The filling kit structure 110 is a molded polymeric structure comprising a container bottom member 112 having a bottom portion 114 with elevated portions 135 having an aperture for connecting elongated leg members 115 to elevate the pouch holding rack 117 and onto which the filling member 121 is mounted.

Figures 10, 11:
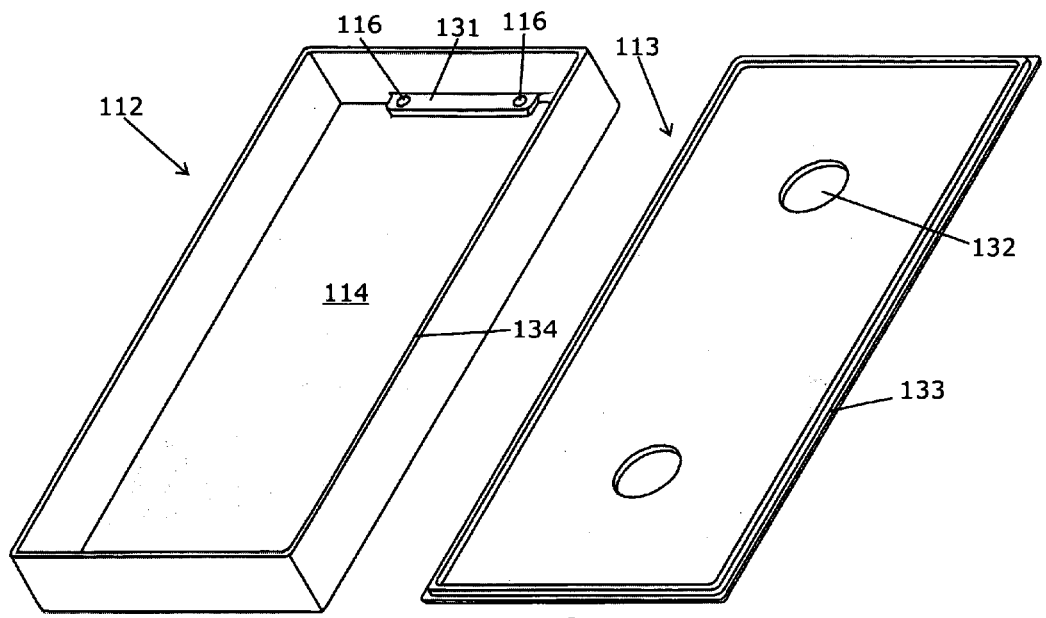
FIG. 10 is a perspective view showing the container bottom member of FIG. 9.
FIG. 11 is a perspective view showing the container top member.

Referring to FIGS. 10-14, the cooperating components of the filling kit structure 110 are shown. Specifically, FIG. 10 shows the container bottom member 112 having a bottom portion 114 and an upper periphery 134. An elevated portion 131 may be disposed on opposite ends, each having apertures 116 for receiving the terminal ends 136 of the elongated leg members 115 shown in FIG. 12. FIG. 11 shows the container top member 113 having holes 132 which are provided to allow a user to easily remove and/or replace the top member 113 from or onto the container bottom member 112. The container top member 113 is shown having a bottom periphery 133 adapted to allow the top member 113 to be frictionally fit onto the periphery 134 of the container bottom member 112 to thereby form a generally rectangular container structure.

Figures 12, 13, 14:
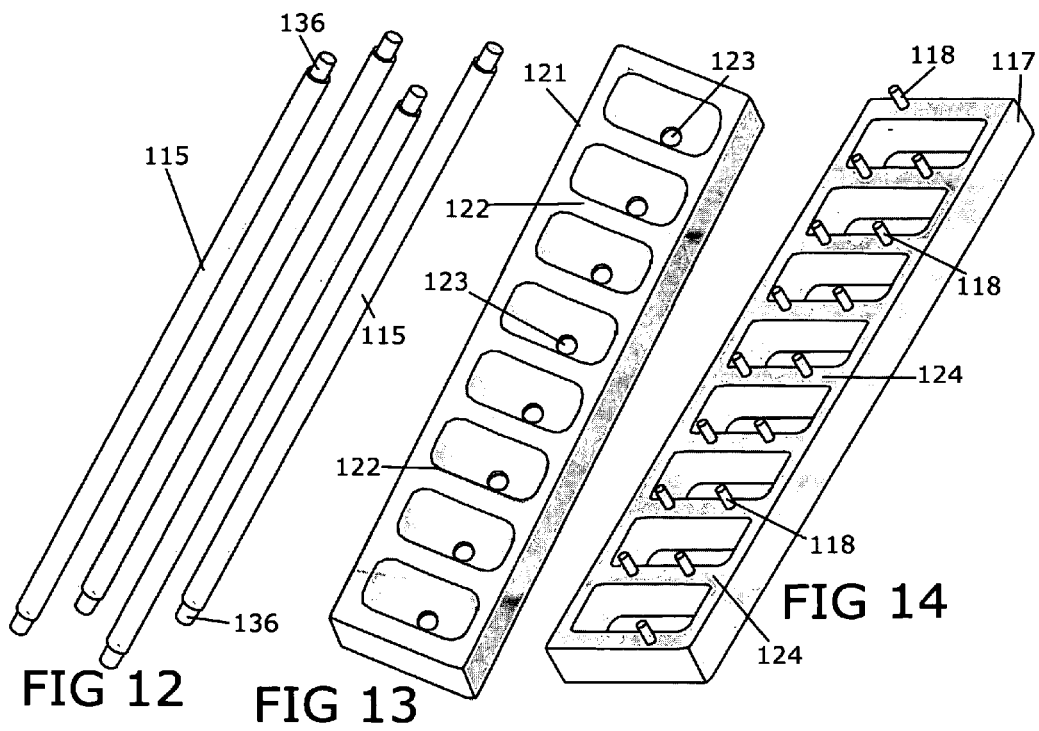
FIG. 12 is a perspective view showing the elongated leg members of FIG. 9.
FIG. 13 is a perspective view showing the filling member of FIG. 9.
FIG. 14 is a perspective view showing the pouch holding rack of FIG. 9.

FIGS. 13 and 14 show the elevated cooperating components elevated by the leg members 115 comprising the pouch holding rack 117 and the pouch filling member 121. The pouch holding rack 117 is shown to have a plurality of generally parallel dividers 124 and from which a plurality of aligned pegs 118 extend. As shown, the end portions of the holding rack 117 may be provided with a single peg 118 and the interior dividers 124 with a pair of pegs 118 so that the top openings of the pouches 19 may be fully opened as shown and discussed with respect to FIG. 5. In FIG. 13, the molded filling member 121 is shown comprising a plurality of cavities defined by dividers 122. Each cavity has a bottom aperture 123 to provide drainage into the open top of the pouch 19 held by the pegs 118 of the pouch holding rack 117 held therebelow. As shown in FIG. 9, the filling member 121 is constructed to frictionally fit onto the structure of the pouch holding rack 117, although other means may be utilized.

It is within the purview of the invention to provide liquid filling kits that may have means to allow a plurality of kits 10 or 110 to be locked together in a side-by-side arrangement, for example, so as to allow for the filling of a plurality of sets of pouches. For example, as shown in FIGS. 2 and 3, the container bottom member 12 may utilize locking pegs 28 and cooperating locking apertures 29 to enable a user to join a plurality of kits 10. The bottom 12 may utilize apertures 29, permanent or removable locking pegs 28 or other locking means to enable a user to join a number of liquid filling kits for purposes of filling a plurality of sets of pouches.

In summary, the pouches 19 may be filled with any desired fluid composition or mixture and in a range of volumetric quantity. For example, the ingredients for a Margarita mix may be provided in an smaller pouch whereas a freezie mixture may be provided in a larger pouch. A pouch length ranging from 1-9 inches may be used in the filling kit, for example, the pouches may be provided with a sealable top having outwardly extending flaps, each having an aperture for engaging the pegs of the pouch holding rack. The sealable top may comprise cooperating sealing ridges, i.e., Zip-loc structures, or may be otherwise sealed as known in the art, i.e., heat or adhesive sealing.

As many changes are possible to the liquid filling kit embodiments of this invention utilizing the teachings thereof, the descriptions above, and the accompanying drawing should be interpreted in the illustrative and not in the limited sense.

That which is claimed is:

1. A filling kit for liquids comprising:
    a) a separable container having a top member and a bottom member and a plurality of cooperating members, said separable container being constructed and arranged for storing and erecting said cooperating members; and
    b) said cooperating members including a liquid filling member having a plurality of cavities, each cavity having an aperture and a pouch holding rack having pouch top holding members, said pouch holding rack disposed below said liquid filling member, wherein said liquid filling member is constructed for positioning on top of said pouch holding rack, whereby subsequent the erecting of said cooperating members into said filling kit, liquids may be poured into said cavities of said liquid filling member for flow through said apertures into open pouches held by said pouch holding rack therebelow.

2. The filling kit for liquids of claim 1, wherein said liquid filling member includes elevation members.

3. The filling kit for liquids of claim 2, wherein said elevation members include a plurality of leg members to hold said liquid filling member above said top member or said bottom member.

4. The filling kit for liquids of claim 1, wherein pouch holding rack has a plurality of divider members and wherein said, pouch top holding members are upwardly extending peg members.

5. The filling kit for liquids of claim 1, wherein said cooperating members further include a plurality of elongated flexible polymeric pouches, each having a sealable top portion.

6. The filling kit for liquids of claim 1, wherein said filling kit is molded of a polymeric material.

7. The filling kit for liquids of claim 6, wherein said cooperating members include a recipe book.

8. A liquid filling kit comprising:
    a) a separable storage container having a bottom portion and a mating top portion constructed to hold the elements for forming said liquid filling kit; and
    b) said elements for forming said liquid filling kit including a pouch holding rack, a plurality of elongated leg members for positioning into said pouch holding rack, said pouch holding rack having a plurality of divider members each having an upwardly extending peg member for engaging opposing apertures in a pouch top, and a filling member having a plurality of apertures constructed for cooperative use with said pouch holding rack, said filling member being constructed to rest on said pouch holding rack and having a plurality of dividers and a bottom having a plurality of apertures therethrough, whereby assembling said storage container and said elements to form a liquid filling kit allows a user to position said pouch holding rack onto said elongated leg members to hold said filling member and to pour a liquid through said apertures in said bottom of said filling member to thereby fill pouches held therebelow.

9. The liquid filling kit of claim 8, wherein said top portion of said bottom portion has a plurality of apertures for receiving said plurality of elongated leg members.

10. The liquid filling kit of claim 9, whereby said pouch holding rack has a bottom with a plurality of apertures aligned with said apertures in said top portion of said bottom portion of said separable storage container.

11. The liquid filling kit of claim 8, wherein said liquid filling kit is molded of a polymeric material.

12. The liquid filling kit of claim 8, wherein said pouch holding rack is constructed to hold a plurality of flexible polymeric pouches.

13. A liquid filling kit comprising:
a) a generally rectangular separable container having a container bottom member and top member, said bottom member having a bottom with a plurality of apertures;
b) a plurality of elongated leg members for frictional engagement in said plurality of apertures in said container bottom member;
c) a pouch holding rack having a bottom with apertures for positioning onto the top terminal ends of said plurality of elongated leg members, said pouch holding rack having a plurality of divider members, each divider member having an upwardly extending peg member;
d) a filling member constructed for positioning on top of said pouch holding rack, said filling member having a plurality of cavities, each having an aperture; and
e) a plurality of flexible pouches, each having a top portion with opposing apertures for engaging said pegs of said pouch holding rack.

14. The liquid filling kit of claim 13, wherein said kit structure is molded of a polymeric material and wherein said kit includes a recipe book.

15. The liquid filling kit of claim 13, wherein said pouches are formed of plastic and wherein each said pouch has a fill line and a sealable top portion.

16. The liquid filling kit of claim 13, wherein said peg members are staggered.

* * * * *